Sept. 9, 1958 R. K. SMITH 2,851,657
COMPARISON TYPE ELECTRICAL TEST SET
Filed Feb. 4, 1955 2 Sheets-Sheet 1

INVENTOR
R. K. SMITH
BY
ATTORNEY

Sept. 9, 1958     R. K. SMITH     2,851,657
COMPARISON TYPE ELECTRICAL TEST SET
Filed Feb. 4, 1955
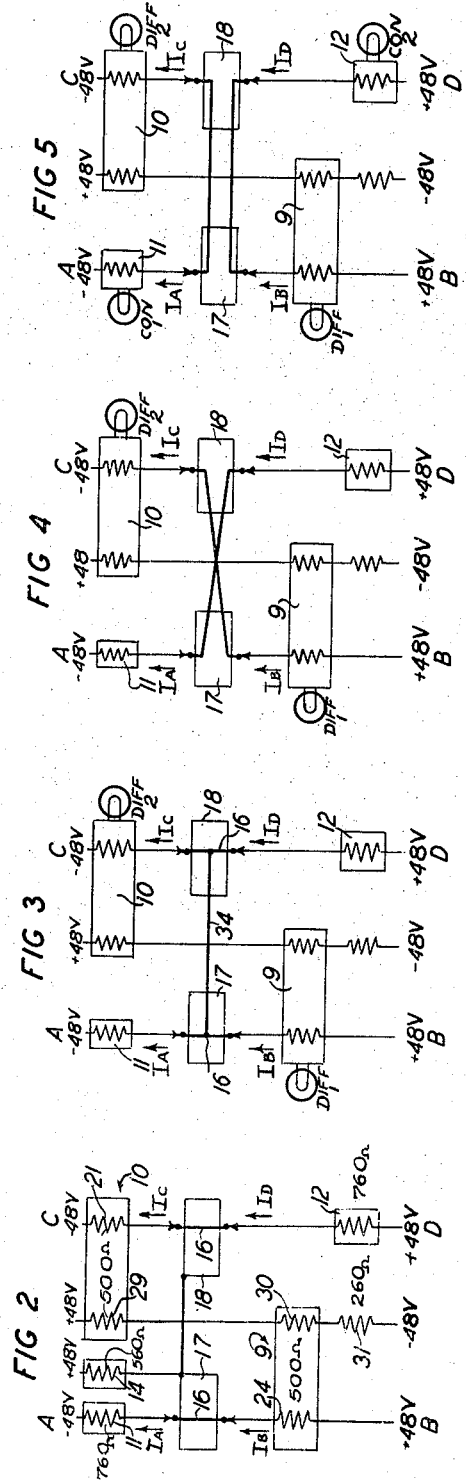
INVENTOR
R. K. SMITH
BY
ATTORNEY United States Patent Office 2,851,657
Patented Sept. 9, 1958

2,851,657

COMPARISON TYPE ELECTRICAL TEST SET

Robert K. Smith, Newark, N. J., assignor to Western Electric Company, Incorporated, New York, N. Y., a corporation of New York Application February 4, 1955, Serial No. 486,057

8 Claims. (Cl. 324—51)

This invention relates to a comparison type electrical test set and it is the object of the invention to simultaneously test the wiring of a pair of similar circuits such as two-terminal network circuits for telephone repeaters.

A test set according to the invention for simultaneously checking two similar two-terminal circuits for wiring faults has two differential relays, a standard branch including one winding of each differential relay, a source of potential and a variable impedance, two test branches oppositely connected across the source of potential and each including the other winding of one of the differential relays, a continuity detecting relay, means for selectively connecting circuits to be tested into the branch between the windings of the relays and indicators controlled by the relays, the variable impedance of the standard branch being adjusted to produce a current therein equal to the currents in the test branches when circuits that are free from faults are connected therein.

According to a feature of the invention, means are provided for detecting short circuits between either of the tested circuits and any of the other circuits to be tested simultaneously and without interfering with the tests on the two circuits connected in the test branches.

These and other features of the invention will be more fully understood from the following detailed description taken in conjunction with the accompanying drawing, in which:

Fig. 2 is a simplified schematic diagram showing the impedances of the various circuit elements of the test set;

Figs. 3 through 8 are schematic circuit diagrams showing the condition of the relays and the energized fault indicators of the test set when different types of faults are present in the wiring of the circuits under test.

Figure 1:
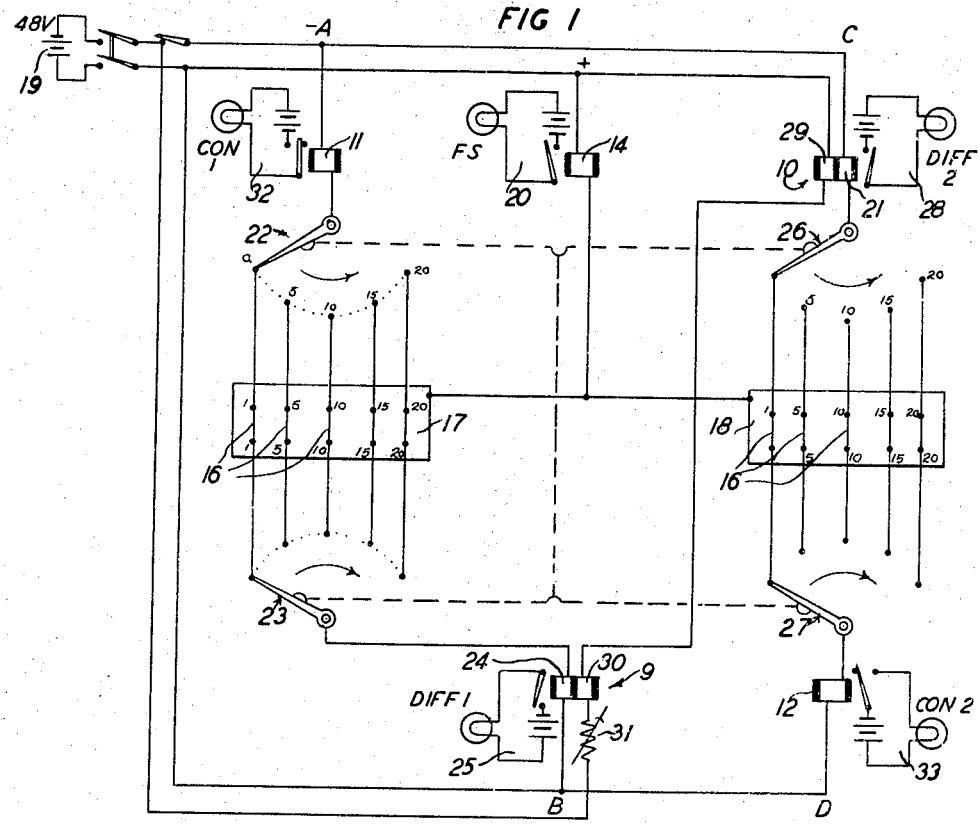
Fig. 1 is a schematic diagram of a test set in accordance with the invention.

Referring now to the drawing it is to be noted that for convenience and simplification of the description the two-terminal circuits to be tested are disclosed as a plurality of wires 16 mounted on frames 17 and 18, but in practice, these wires may be two-terminal circuits comprising fixed impedances, or repeater network circuits. Also, to simplify the wiring of the test set, it has been assumed for the purposes of this description that corresponding related wires occupy corresponding positions on the frames.

Figure 9:
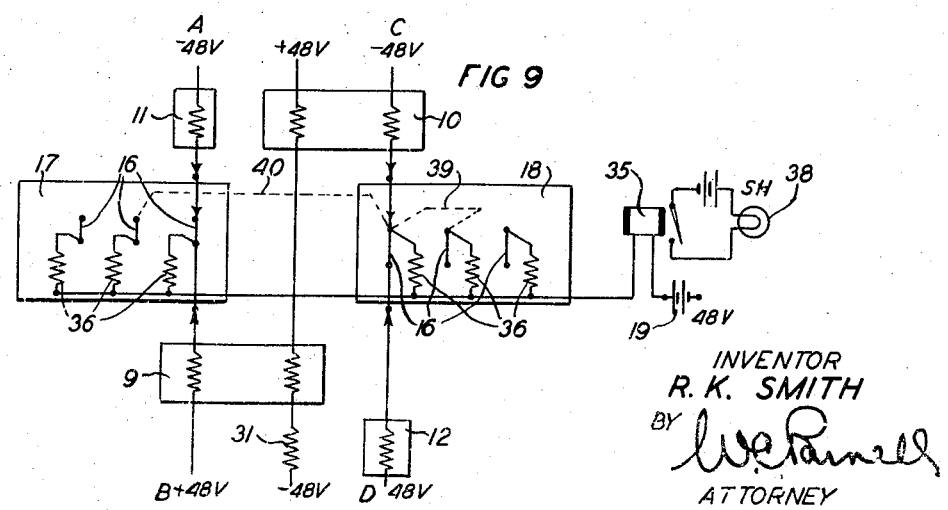
Fig. 9 is a schematic diagram of the auxiliary short circuit detecting circuit which may be used in conjunction with the test set of Fig. 1.

Basically the test set comprises two test branches, a standard branch and an auxiliary short circuit detecting circuit shown separately in Fig. 9. The first test branch "A—B" extends between the negative side of a battery 19, through the winding of a continuity detecting relay 11, the movable contact arm of a multi-position selector switch 22, from the terminals of the switch to the one end of each of the wires 16 on frame 17, from the other end of the wires 16 to the terminals of the selector switch 23, the movable contact arm thereof and a winding 24 of a double winding differential type relay 9 which has an impedance different from that of relay 11 and is finally connected to the positive side of the battery 19. Both relays 11 and 9 have fault indicator circuits 32 and 25 respectively which are energized by the releasing of relay 11 and the operation of relay 9 respectively.

The second test branch "C—D" contains components similar to those of branch "A—B" but the continuity detecting relay 12 and winding 21 of differential relay 10 are connected across the source 19 oppositely of those of branch "A—B." The selector switches 26 and 27, which are connected to the ends of the wires 16 of frame 18, are similar to switches 22 and 23 of branch "A—B" and all four selector switches are ganged together for simultaneous operation to make connection with the ends of corresponding wires on the two frames. In practice these switches may be operated either manually or they may be stepped automatically.

A standard branch is also connected across battery 19 and includes winding 29 of relay 10 connected to the positive side of battery 19, winding 30 of relay 9 and a variable resistor 31 connected to the negative side of battery 19.

The impedances of the test set are shown in Fig. 2 and for the first test branch "A—B," includes 760 ohm winding of relay 11, the impedance of the circuit under test, which is negligible in this instance, and the 500 ohm winding 24 of relay 9. The impedance of the second test branch "C—D" includes the 500 ohm winding 21 of relay 10 and the 760 ohm winding of relay 12. The impedance of the standard branch comprises the 500 ohm winding 29 of relay 10, the 500 ohm winding 30 of relay 9 and the impedance of resistor 31 which is adjusted to 260 ohms plus the impedance of the circuit to be tested, in this case to 260 ohms in order to make the overall impedance of the standard circuit equal to the impedances of the test circuit. This adjustment of resistor 31 makes the current in windings of the differential relays the same.

For the condition, shown in Fig. 2, where there are no faults in the wires 16 of frames 17 and 18 the currents $I_A$, $I_B$, $I_C$ and $I_D$ are all equal (about 38 milliamperes) and the continuity relays 11 and 12 are energized so that the indicators 32 and 33 therefor will not be energized and the differential relays 9 and 10, having equal and opposite currents in their windings remain unoperated thereby keeping their indicator circuits 25 and 28 respectively (DIFF-1 and DIFF-2) de-energized.

In the case of a short circuit between corresponding wires of 2 circuits being tested, as shown in Fig. 3, the currents $I_A$, $I_B$, $I_C$ and $I_D$ in relays 11, 9, 10 and 12 are 31.6, 48 48 and 31.6 milliamperes respectively and the current in the standard branch is 38 milliamperes. Under this condition since there are different currents in the windings of the differential relays 9 and 10, both of these relays operate to energize their respective indicators.

In the case of an end to end reverse between the 2 wires being tested, as shown in Fig. 4, the currents $I_A$, $I_B$, $I_C$ and $I_D$ are again 31.6, 48, 48, and 31.6 respectively. Again since the currents in the windings of the differential relays 9 and 10 are different, the indicators of both differential relays are energized.

In the case of a same end reverse of the wires being tested, as shown in Fig. 5, since there is no potential difference between the resulting circuits, $I_A$, $I_B$, $I_C$ and $I_D$ are zero. In this case indicators for relays 11, 9, 12 and 10 are all energized.

In the case where one circuit is reversed on unrelated circuits and the other circuit is open, as seen in Fig. 6, a condition similar to that of Fig. 5 exists and currents $I_A$, $I_B$, $I_C$ and $I_D$ are zero and the indicators for relays 11, 9, 12 and 10 are again energized.

In the case where only one circuit is open or reversed with an unrelated circuit, as seen in Fig. 7, the current in branch "A—B" ($I_A$ and $I_B$) is 38 milliamperes, the current in branch "C—D" ($I_C$ and $I_D$) is zero and only the indicators of relays 12 and 10 are energized.

In the case where one of the tested circuits has a frame ground, as seen in Fig. 8, the resistance of winding 24 of relay 9 is shunted with the resistance of relay 14 thereby reducing the overall impedance of the circuit "A—B" and $I_A$ is 47 milliamps, $I_B$ is 25 milliamps and $I_G$ is 22 millamps. In this case, relay 9 operates to energize indicator "DIFF–1" and indicator "FG," controlled by relay 14, is energized to indicate a frame ground.

Referring now to the short circuit detecting circuit of Fig. 9, each of the wires 16 on frames 17 and 18 is connected to one end of a 0.2 megohm resistor 36 the other sides of which are connected together through the winding of a 500 ohm marginal relay 35 to the plus side of battery 19. In the absence of any fault, the two resistors 36 associated with the wires under test are in parallel in the circuit of the relay 35 and limit the current to about 0.47 milliamperes which is not sufficient to operate the relay. If there is a short circuit betwen any two of the wires 16, as indicated for example at 39 or 40, there will be three resistors 36 in parallel, the relay current increases to about 0.70 milliamperes and the relay operates energizing the short circuit indicator 38. Since, even in the short circuited conditions, the impedance of this relay circuit is very large as compared to the impedance of either of the test branches this circuit will not affect either of the test branches sufficiently to give a false indication of a fault therein unless one of the faults as discussed above is present.

The different indicators greatly expedite detection of wiring faults even though in some instances similar indicators may be energized for different types of faults (i. e., short circuits, Fig. 3 and end to end reverses, Fig. 4). In any event, however, the test set will detect any of the common types of wiring troubles and the testers task of locating the faults is greatly simplified.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In a comparison test set for simultaneously testing two two-terminal circuits for direct current resistance and wiring errors, two double winding differential relays, a standard branch including one winding of each differential relay, a source of potential and means for adjusting the current in said branch, two test branches oppositely connected across the source of potential and each including the other winding of one of the differential relays, a continuity detecting relay having an impedance different from that of the windings of the differential relays, means for selectively connecting circuits to be tested into the test branches between the windings of the relays and an indicator controlled by each of the relays.

2. In a comparison test set for simultaneously testing two corresponding circuits of a plurality of two-terminal circuits for direct current resistance and wiring errors, two double winding differential relays, a standard branch including one winding of each differential relay, a source of potential and a variable impedance, two test branches oppositely connected across the source of potential and each including the other winding of one of the differential relays, a continuity detecting relay having an impedance different from the impedance of the differential relays, switching means for selectively connecting corresponding two-terminal circuits to be tested into the test branches between the windings of the relays and an indicator controlled by each of the relays.

3. In a comparison test set for simultaneously testing the direct current resistance and the wiring of corresponding two circuits of a plurality of two-terminal circuits which are mounted to a frame, two double winding differential relays, a standard branch including one winding of each differential relay, a source of potential and a variable impedance, two test branches oppositely connected across the source of potential and each including the other winding of one of the differential relays, a continuity detecting relay having an impedance different from that of the windings of the differential relays, means for selectively connecting circuits to be tested into the test branches between the windings of the relays, a frame ground test branch including a relay connected between the frame and one side of the source of potential, and an indicator controlled by each of the relays.

4. In a comparison test set for simultaneously testing the direct current resistance and the wiring of two corresponding circuits of a plurality of two-terminal circuits, corresponding circuits being mounted to separate frames, two double winding differential relays, a standard branch including one winding of each differential relay, a source of potential and a variable impedance, two test branches oppositely connected across the source of potential and each including the other winding of one of the differential relays, a continuity detecting relay having an impedance different from the impedance of the differential relays, switching means for selectively connecting corresponding two-terminal circuits to be tested into the test branches between the windings of the relays, a frame ground test branch including means for electrically connecting the frames together and a relay connected between the frames and one side of the source of potential and an indicator controlled by each of the relays.

5. In a comparison test set for simultaneously testing the direct current resistance and the wiring of two corresponding circuits of a plurality of two-terminal circuits, two double winding differential relays, a standard branch including one winding of each differential relay, a source of potential and means for adjusting the current in said branch, two test branches oppositely connected across the source of potential and each including the other winding of one of the differential relays, a continuity detecting relay having an impedance different from the impedance of the differential relays, switching means for selectively connecting corresponding two-terminal circuits to be tested into the test branches between the windings of the relays, a short circuit detecting branch including a marginal relay connected to one side of the source and a plurality of elements having impedances that are large with respect to the total impedances of the test branches, means for connecting one side of each impedance element to each of the circuits to be tested and for connecting the other ends of the elements together to the relay winding and an indicator controlled by each of the relays.

6. In a comparison test set for simultaneously testing the direct current resistance and the wiring of two circuits of a plurality of two-terminal circuits which are mounted to a frame, two double winding differential relays, a standard branch including one winding of each differential relay, a source of potential and a variable impedance, two test branches oppositely connected across the source of potential and each including the other winding of one of the differential relays, a continuity detecting relay having an impedance different from that of the windings of the differential relays, means for selectively connecting circuits to be tested into the test branches between the windings of the relays, a short circuit detecting branch including a marginal relay connected to one side of the source and a plurality of elements having impedances that are large with respect to the total impedances of the test branches, means for connecting one side of each impedance element to each of the circuits to be tested and for connecting the other ends of the elements together to the relay winding, a frame ground test branch including a relay connected between the frame and one side of the source of test potential and an indicator controlled by each of the relays.

7. In a test set for simultaneously testing the direct current resistance and the wiring of corresponding two circuits of a plurality of similar circuits, two similar test branches including a source of test potential, continuity detecting means and means for selectively connecting circuits to be tested therein, a short circuit detecting branch including a marginal relay connected to one side of the source and a plurality of elements having impedances that are large with respect to the total impedances of the test branches, means for connecting one side of each impedance element to each of the circuits to be tested and for connecting the other ends of the elements together to the relay winding and an indicator controlled by the relay.

8. In a test set for simultaneously testing the direct current resistance and the wiring of corresponding two circuits of a plurality of similar circuits which are mounted to a frame, two similar test branches including a source of test potential, continuity detecting means and means for selectively connecting circuits to be tested therein, a short circuit detecting branch including a marginal relay connected to one side of the source and a plurality of elements having impedances that are large with respect to the total impedances of the test branches, means for connecting one side of each impedance element to each of the circuits to be tested and for connecting the other ends of the elements together to the relay winding, a frame ground test branch including a relay connected between the frame and one side of the source of test potential and an indicator controlled by each of the relays.

References Cited in the file of this patent

UNITED STATES PATENTS

| | | |
|---|---|---|
| 383,605 | Wheeler | May 29, 1888 |
| 610,903 | Hewlett | Sept. 20, 1898 |
| 1,333,892 | Ackerman | Mar. 16, 1920 |
| 1,347,772 | Bash | July 27, 1920 |
| 1,901,488 | Applegate | Mar. 14, 1933 |
| 2,468,398 | Griffin | Apr. 26, 1949 |
| 2,547,011 | Jacobsen | Apr. 3, 1951 |

FOREIGN PATENTS

| | | |
|---|---|---|
| 515,398 | Belgium | Nov. 29, 1952 |